(12) United States Patent
Vikberg et al.

(10) Patent No.: US 8,428,553 B2
(45) Date of Patent: Apr. 23, 2013

(54) METHOD AND APPARATUS FOR PROTECTING A CORE NETWORK

(75) Inventors: Jari Tapio Vikberg, Jarna (SE); Tomas Nylander, Varmdo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1001 days.

(21) Appl. No.: 11/814,522

(22) PCT Filed: Jan. 24, 2005

(86) PCT No.: PCT/IB2005/000103
§ 371 (c)(1),
(2), (4) Date: Jul. 23, 2007

(87) PCT Pub. No.: WO2006/077449
PCT Pub. Date: Jul. 27, 2006

(65) Prior Publication Data
US 2008/0146222 A1      Jun. 19, 2008

(51) Int. Cl.
*H04M 1/66* (2006.01)
(52) U.S. Cl.
USPC ......... 455/410; 455/435.1; 455/433; 380/247
(58) Field of Classification Search .................. 455/410, 455/435.1, 411, 433; 380/247
See application file for complete search history.

(56) References Cited

U.S. PATENT DOCUMENTS

| | | | |
|---|---|---|---|
| 6,038,446 A * | 3/2000 | Courtney et al. | 455/428 |
| 6,792,278 B1 * | 9/2004 | Ahmavaara et al. | 455/461 |
| 7,085,567 B1 | 8/2006 | Rajaniemi | |
| 7,124,201 B2 * | 10/2006 | Iyoki | 709/245 |
| 7,668,147 B2 * | 2/2010 | Lindsay et al. | 370/347 |
| 2001/0044295 A1 | 11/2001 | Saito et al. | |
| 2002/0167965 A1 * | 11/2002 | Beasley et al. | 370/465 |
| 2003/0081607 A1 | 5/2003 | Kavanagh | |

FOREIGN PATENT DOCUMENTS

JP        2004-215118 A       7/2004

OTHER PUBLICATIONS

Gopal L R et al: "User plane firewall for 3g mobile network" Vehicular Technology Conference, 2003. VTC 2003—Fall.2003 IEEE 58th Orlando, FL, USA Oct. 6-9, Piscataway, NJ, USA, IEEE, US, Oct. 6, 2003, pp. 2117-2121, XP010701756.

* cited by examiner

*Primary Examiner* — Olumide T Ajibade Akonai
*Assistant Examiner* — Edward Zhang

(57) ABSTRACT

The present invention provides a method and apparatus for protecting a core network (102) by receiving (202) a message (302, 402) containing a mobile identity of a MS (104) and dropping (210) the message (302, 402) whenever the received mobile identity does not match a stored mobile identity associated with the MS (104). The message (302, 402) is processed (208) whenever the received mobile identity matches the stored mobile identity associated with the MS (104). The mobile identity can be an IMSI, a TMSI or a P-TMSI. The message (302, 402) can be an uplink message (302) or a downlink message (402), such as a Mobility Management (MM) message, a General Packet Radio Service (GPRS) Mobility Management (GMM) message, or a UMA or Unlicensed Radio Resources (URR) message. The present invention can be implemented as a computer program embodied on a computer readable medium wherein the various method steps are implemented by one or more code segments.

22 Claims, 4 Drawing Sheets

METHOD AND APPARATUS FOR PROTECTING A CORE NETWORK

FIELD OF INVENTION

The present invention relates in general to the field of mobile communications and, more particularly, to a method and apparatus for protecting a core network by checking mobile identities of mobile stations within unlicensed mobile access networks.

BACKGROUND ART

The unlicensed mobile access (UMA) specifications recommend that the unlicensed network controller (UNC) and the unlicensed network controller secure gateway (UNC-SGW) should check that the same International Mobile Subscriber Identity (IMSI) is used when a mobile station (MS) establishes the IPsec secure connection towards the UNC-SGW and when the MS registers at the UNC. In both these instances, the MS provides the IMSI to the UNC-SGW and UNC, respectively. Yet, the implementation of these recommendations still leaves the core network open to attacks.

This is also the case in the 3d Generation Partnership Project (3GPP) standards for "Generic Access to A and Gb-interface", otherwise known as a Generic Access Network (GAN). See 3GPP Technical Specifications 43.318 (Stage-2) and 44.318 (Stage 3). Note that the generic access network controller (GANC) in the 3GPP specifications is equivalent to the UNC in the UMA specifications. Similarly, the generic access network controller secure gateway (GANC-SEGW) in the 3GPP specifications is equivalent to the UNC-SGW in the UMA specifications.

For example, a MS could use multiple Temporary Mobile Subscriber Identities (TMSI) or Packet Temporary Mobile Subscriber Identities (P-TMSI) to emulate multiple MSs, such as a personal computer (PC) with a SIM-card reader and a UMA client. Moreover, a hostile MS could send Location Updates or IMSI Detach messages towards the core network causing a type of denial-of-service (DoS) attack on the MS-level (terminating calls would fail, etc.). Accordingly, there is a need for a method and apparatus that protects the core network by checking the mobile identities (IMSI, TMSI and/or P-TMSI) used by mobile stations when they communicate with the core network.

SUMMARY OF THE INVENTION

The present invention provides a method and apparatus that protects the core network by checking the mobile identities (International Mobile Subscriber Identity (IMSI), Temporary Mobile Subscriber Identity (TMSI) and/or Packet Temporary Mobile Subscriber Identity (P-TMSI)) used by mobile stations (MS) when they communicate with the core network. Simply stated, messages that contain a mobile identifier which does not correspond to a stored mobile identifier associated with the MS (after registration) are dropped. Once such a message is dropped, various preventive and reporting actions can be taken. The MS is, therefore, only permitted to use one IMSI, one TMSI and one P-TMSI. As a result, the present invention protects the core network from malicious and faulty MS implementations. Note that the present invention is applicable to both unlicensed mobile access networks (UMAN) and GANs.

More specifically, the present invention provides a method for protecting a core network by receiving a message containing a mobile identity of a MS and dropping the message whenever the received mobile identity does not match a stored mobile identity associated with the MS. The message is processed whenever the received mobile identity matches the stored mobile identity associated with the MS. The mobile identity can be an IMSI, TMSI or a P-TMSI. The message can be an uplink message or a downlink message, such as a Mobility Management (MM) message, a General Packet Radio Service (GPRS) Mobility Management (GMM) message, or a UMA or Unlicensed Radio Resources (URR) message (only used between MS and UNC). The present invention can be implemented as a computer program embodied on a computer readable medium wherein the various method steps are implemented by one or more code segments.

In addition, the present invention provides an apparatus that includes a data storage device communicably coupled to a processor. The data storage device stores associations of mobile identities to MSs. The processor receives a message containing a mobile identity of a MS and drops the message whenever the received mobile identity does not match a stored mobile identity associated with the MS. The apparatus is typically an unlicensed network controller (UNC) within an unlicensed mobile access network (UMAN) or a generic access network controller (GANC) within a generic access network (GAN) that is in communication with the core network.

BRIEF DESCRIPTION OF THE DRAWINGS

Further benefits and advantages of the present invention will become more apparent from the following description of various embodiments that are given by way of example with reference to the accompanying drawings.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
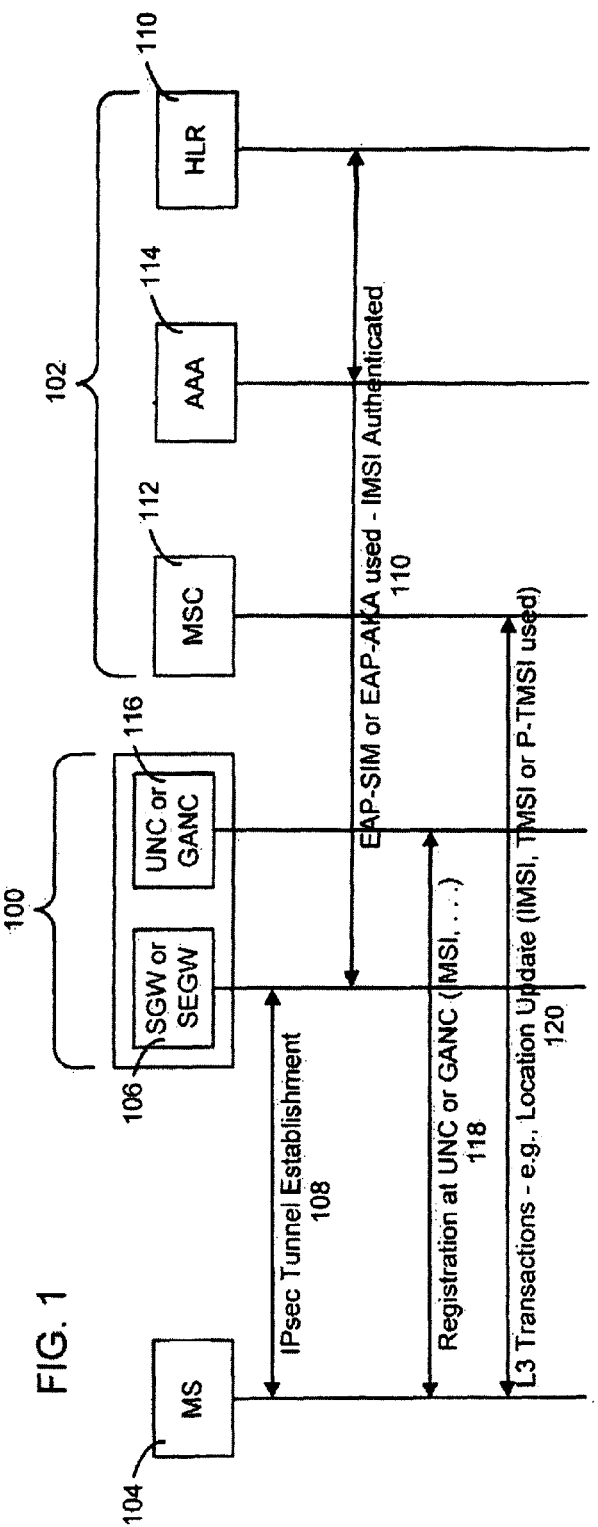
FIG. 1 is a representative signaling sequence depicting the use of mobile identities between a UMA network and a core network.

The present invention provides a method and apparatus that protects the core network by checking the mobile identities (International Mobile Subscriber Identity (IMSI), Temporary Mobile Subscriber Identities (TMSI) and/or Packet Temporary Mobile Subscriber Identity (P-TMSI)) used by mobile stations (MS) when they communicate with the core network. Simply stated, messages that contain a mobile identifier which does not correspond to a stored mobile identifier associated with the MS (after registration) are dropped. Once such a message is dropped, various preventive and reporting actions can be taken. The MS is, therefore, only permitted to use one IMSI, one TMSI and one P-TMSI. As a result, the present invention protects the core network from malicious and faulty MS implementations. Note that the present invention is applicable to both unlicensed mobile access networks (UMAN) and GANs Now referring to FIG. 1, a representative signaling sequence depicting the use of mobile identities between an unlicensed mobile access (UMA) network (UMAN) or a generic access network (GAN) 100 and a core network 102 is shown. The MS 104 provides the IMSI to the secure gateway of the unlicensed network controller (UNC-SGW) or generic access network controller (GANC-SEGW) 106 using EAP-SIM or EAP-AKA when the MS 104 establishes the IPsec secure connection 108 towards the UNC-SGW or GANC-SEGW 106. The UNC-SGW or GANC-SEGW 106 authenticates 110 this IMSI in the HLR 110 using well known signaling and authentication protocols (authentication, authorization and accounting (AAA) infrastructure 114). The MS 104 also provides the IMSI to the unlicensed network controller (UNC) or generic access network controller (GANC) 116 when the MS 104 registers 118 with the UNC or GANC 116. In addition, the MS 104 uses IMSI, TMSI or P-TMSI to identify itself when the MS 104 communicates 120 with the core network 102 (e.g., MSC 112).

Note that the TMSI and P-TMSI are not reported to the UNC or GANC 116 when registering 118. The TMSI and P-TMSI have significance only within a location area. Outside the location area, the TMSI and P-TMSI have to be combined with the Location Area Identifier (LAI) to provide for an unambiguous identity. Usually the TMSI or P-TMSI reallocations are performed at least at each change of a location area. Such choices are left to the network operator.

Mobile identity is used in the following Mobility Management (MM) messages between the MS 104 and the MSC/Visiting Location Register (VLR) 112.

From the MS 104 to the MSC/VLR 112 (uplink messages):
LOCATION UPDATING REQUEST
IDENTITY RESPONSE
CM SERVICE REQUEST
IMSI DETACH INDICATION
CM RE-ESTABLISHMENT REQUEST From the MSC/VLR 112 to the MS 104 (downlink messages):
TMSI REALLOCATION COMMAND
LOCATION UPDATING ACCEPT Mobile identity is also used in the PAGING RESPONSE message from the MS 104 to the MSC/VLR 112. The UNC or GANC 116 can, therefore, perform checks on MM-messages sent between the MS 104 and the MSC/VLR 112.

Figure 2:
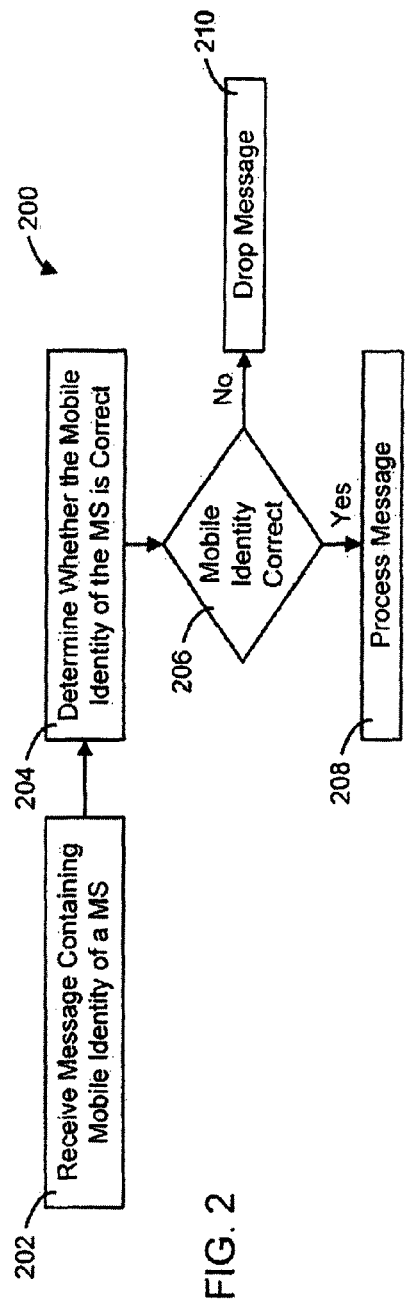
FIG. 2 is a flow chart depicting a method of protecting a core network in accordance with the present invention.

Referring now to FIG. 2, a flow chart depicting a method 200 of protecting a core network 102 in accordance with the present invention is shown. The UNC or GANC 116 receives a message containing a mobile identity of a MS 104 in block 202. The UNC or GANC 116 then determines whether the received mobile identity is correct by comparing it to a stored mobile identity that is associated with the MS 104 in block 204. If the received mobile identity is correct, as determined in decision block 206, the received message is processed (e.g., forwarded, etc.) in block 208. If, however, the received mobile identity is not correct, as determined in decision block 206, the received message is dropped in block 210. The mobile identity can be an IMSI, TMSI or a P-TMSI. The received message can be an uplink message or a downlink message, such as a Mobility Management (MM) message, a General Packet Radio Service (GPRS) Mobility Management (GMM) message, or a UMA or Unlicensed Radio Resources (URR) message (only used between the MS 104 and UNC 116).

The UNC or GANC 116 determines whether the mobile identity of the MS 104 is correct by performing a layer violation, i.e., sneaking into the upper layer messages sent by the MS 104 towards the core network 102 to see if the MS 104 is using the same IMSI as it used for registering with the UNC or GANC 116. Since the TMSI value is assigned by the MSCNLR 112 and the P-TMSI is assigned by the SGSN, the UNC or GANC 116 can check that the MS 104 is using the value assigned by the MSC 112. This can again be performed by checking the upper layer downlink messages sent by the core network 102, to see which TMSI value or P-TMSI value is assigned to the MS 104 and then by checking the upper layer uplink messages that the MS 104 is really using the assigned TMSI value or P-TMSI value.

The present invention can be implemented as an apparatus, such as UNC or GANC 116, that includes a data storage device communicably coupled to a processor. The data storage device stores associations of mobile identities to MSs 104. The processor receives a message 202 containing a mobile identity of a MS 104 and drops the message 210 whenever the received mobile identity does not match a stored mobile identity associated with the MS 104. The processor can be a pre-processor, filter or other processing device within the apparatus. The data storage device can be a memory, disk drive, hard drive, etc.

Figure 3:
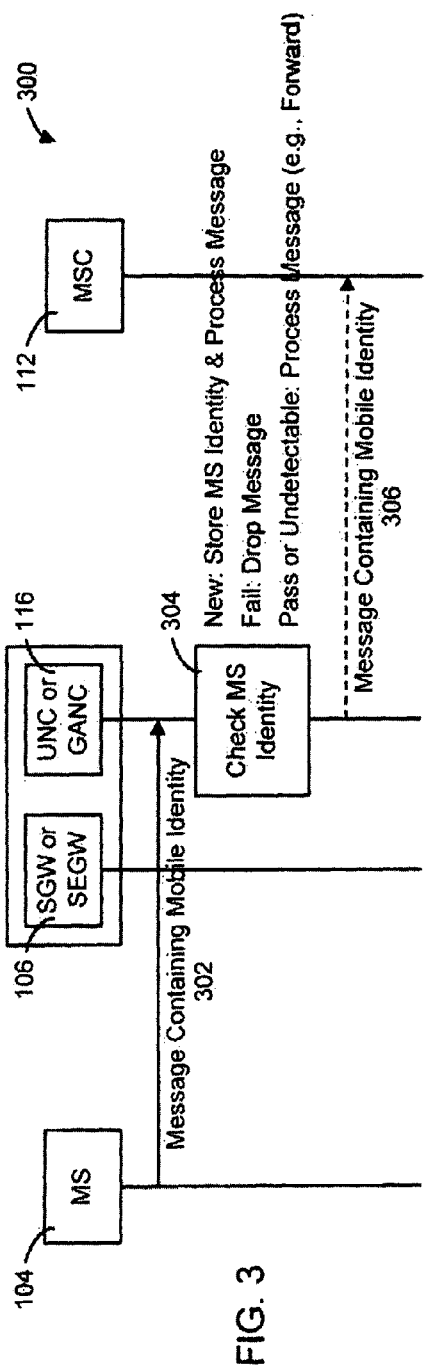
FIG. 3 is a signaling sequence depicting the use of one embodiment of the present invention with respect to uplink messages.

Now referring to FIG. 3, a signaling sequence 300 depicting the use of one embodiment of the present invention with respect to uplink messages 302 is shown. When the UNC or GANC 116 receives an uplink message 302 containing a mobile identity, the UNC or GANC 116 checks 304 the mobile identity. If the uplink message 302 is a registration request (i.e., a new MS 104), the UNC or GANC 116 will store the received mobile identity and associate it with the MS 104, and process the received message (i.e., perform the registration). If the check 304 fails—the received mobile identity does not match the stored mobile identity associated with the MS 104—the message 302 is dropped. If, however, the check 304 passes—the received mobile identity matches the stored mobile identity associated with the MS 104—or the mobile identity is undetectable, the UNC or GANC 116 processes the message 302 (e.g., forwards message 306). The mobile identity may be undetectable in some of the GMM-messages GPRS Mobility Management (GMM) messages between the MS 104 and the SGSN because they can be sent ciphered on LLC-layer and the UNC or GANC 116 cannot easily sneak into these messages. For example, the ROUTING AREA UPDATE REQUEST message is normally sent unciphered and the UNC or GANC 116 can perform checks on this message.

More specifically, if the uplink message 302 contains an IMSI, then the UNC or GANC 116 checks that this IMSI is the same as the one provided by the MS 104 during registration. If it is the same, then the message 306 is forwarded to the core network. If it is different, the message is dropped. The UNC or GANC 116 may also deregister the MS 104 and black list temporarily the IP address used by the MS 104. Other actions may include notifying the operator with an alarm and logging the event.

If the uplink message 302 contains a TMSI or a P-TMSI and the UNC or GANC 116 has not stored a TMSI or P-TMSI for this MS 104, the TMSI or P-TMSI is stored in the MS 104 context. If, however, the UNC or GANC 116 has already stored a TMSI or P-TMSI for this MS 104, the UNC or GANC 116 checks that these TMSI or P-TMSI values are the same. If they are same, the message 306 is forwarded to the core network. If they are different, the message is dropped. The UNC or GANC 116 may also deregister the MS 104 and black list temporarily the IP address used by the MS 104. Other actions may include notifying the operator with an alarm and logging the event.

Figure 4:
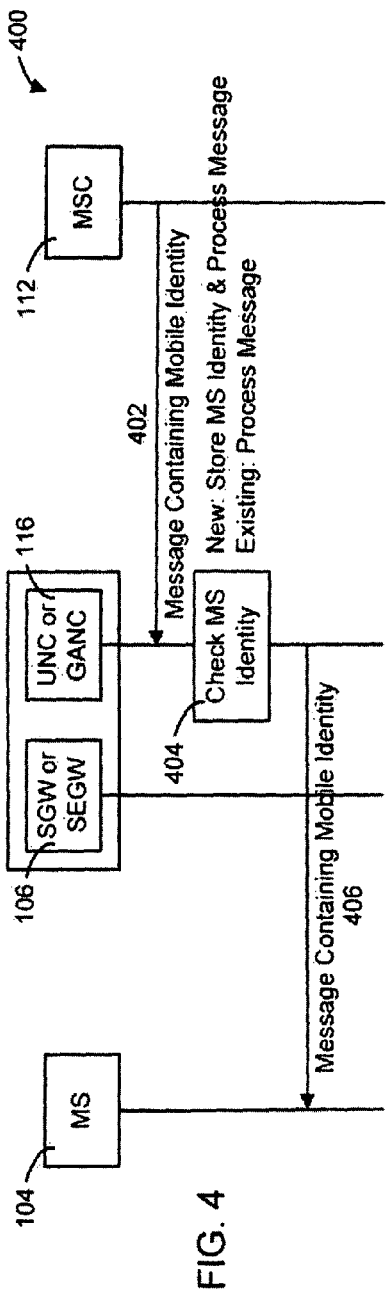
FIG. 4 is a signaling sequence depicting the use of one embodiment of the present invention with respect to downlink messages.

Referring now to FIG. 4, a signaling sequence 400 depicting the use of one embodiment of the present invention with respect to downlink messages 402 is shown. When the UNC or GANC 116 receives a downlink message 402 containing a mobile identity, the UNC or GANC 116 checks 404 the mobile identity. If the downlink message 402 contains a new mobile identity (newly assigned or changed) for a MS 104, the UNC or GANC 116 will store the received mobile identity and associate it with the MS 104, and process the received message (i.e., forward the message 406 to the MS 104). If the check 404 reveals that the mobile identity has already been stored (e.g., already exists) for the MS 104, the received message is processed (i.e., forward the message 406 to the MS 104). Alternatively, the mobile identity can be held and not stored until an uplink message is received that accepts, acknowledges or completes the downlink message 402.

For example, if a downlink message 402 is a TMSI REALLOCATION COMMAND, then the UNC or GANC 116 stores the assigned TMSI value in the MS 104 context. Downlink messages are received on a signaling connection that is associated with the MS 104 context. The storing of the TMSI to the MS 104 context could also be delayed until a TMSI REALLOCATION COMPLETE message is received from the MS 104. Likewise, if the downlink message 402 is a LOCATION UPDATING ACCEPT and a new TMSI is assigned to the MS 104, then the UNC or GANC 116 stores the assigned TMSI value in the MS 104 context. The storing of the TMSI to the MS 104 context could also be delayed until a TMSI REALLOCATION COMPLETE message is received from the MS 104. The process for a P-TMSI REALLOCATION COMMAND is handled the same way.

Figure 5:
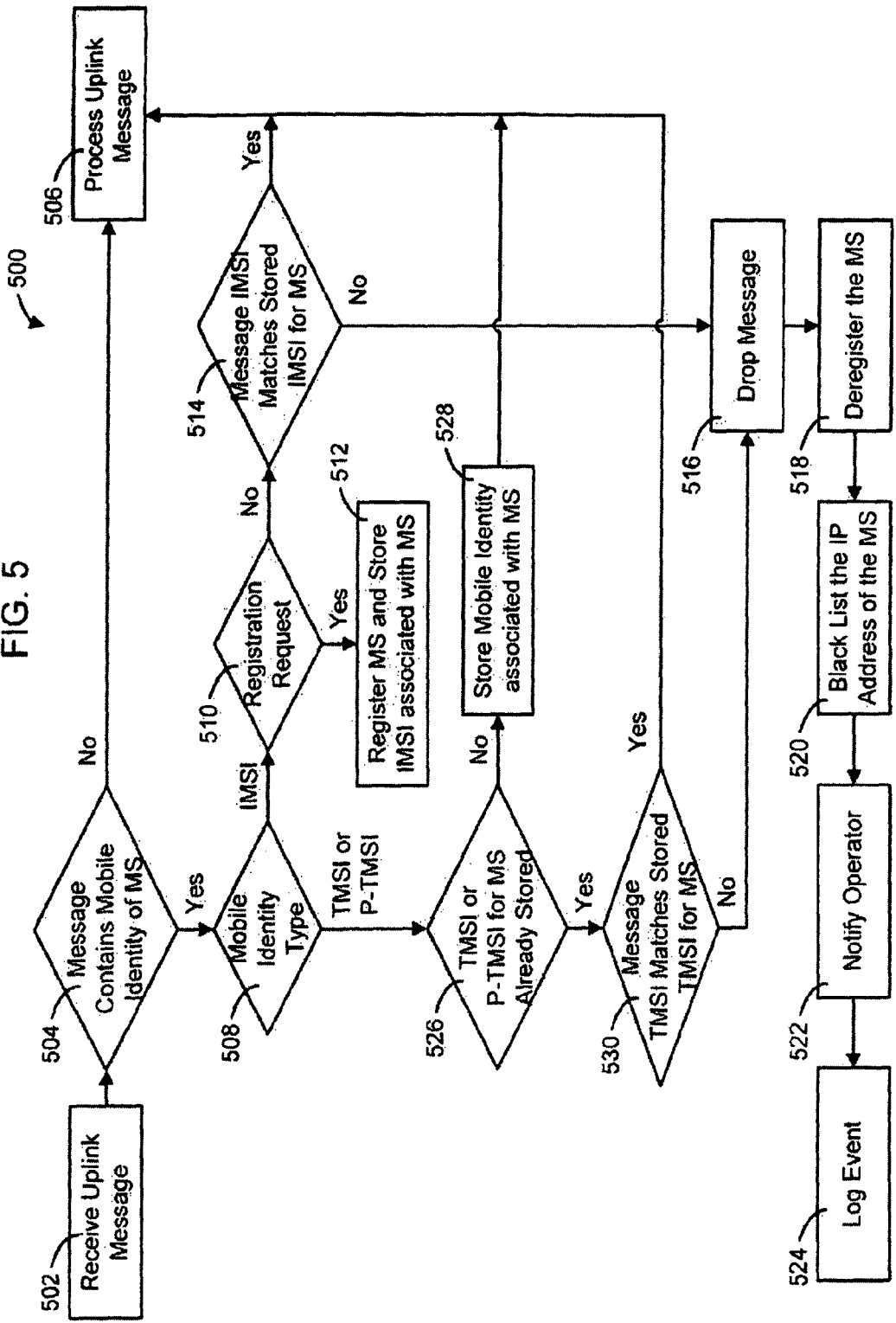
FIG. 5 is a flow chart depicting a method in accordance with one embodiment of the present invention with respect to uplink messages.

Now referring to FIG. 5, a flow chart depicting a method 500 in accordance with one embodiment of the present invention with respect to uplink messages is shown. A uplink message is received in block 502. If the received message does not contain a mobile identity of the MS (or is undetectable), as determined in decision block 504, the uplink message is processed in block 506 (e.g., forwarded, executed, etc.). If, however, the uplink message contains a mobile identity of the MS, as determined in decision block 504, and the mobile identity is an IMSI, as determined in decision block 508, and the uplink message is a registration request, as determined in decision block 510, the IMSI is stored and associated with the MS and the MS is registered in block 512. If, however, the uplink message is not a registration request, as determined in decision block 510, and the received IMSI matches the stored IMSI associated with the MS, as determined in decision block 514, the message is processed normally in block 506. If, however, the received IMSI does not match the stored IMSI associated with the MS, as determined in decision block 514, the message is dropped in block 516. The UNC or GANC 116 may also perform any or all of the following actions: deregister the MS in block 518; black list the IP address associated with the MS for a period of time in block 520; notify a system operator of the dropped message and deregistration of the mobile station in block 522; or log information about the dropped message and deregistration of the mobile station in block 524.

If, however, the mobile identity is a TMSI or P-TMSI, as determined in decision block 508, and a TMSI or P-TMSI has not already been stored for the MS, as determined in decision block 526, the TMSI or P-TMSI is stored and associated with the MS in block 528 and the message is processed normally in block 506. If, however, a TMSI or P-TMSI has already been stored for the MS, as determined in decision block 526, and the received TMSI or P-TMSI matches the stored TMSI or P-TMSI associated with the MS, as determined in decision block 530, the message is processed normally in block 506. If, however, the received TMSI or P-TMSI does not match the stored TMSI or P-TMSI associated with the MS, as determined in decision block 530, the message is dropped in block 516. The UNC or GANC 116 may also perform any or all of the following actions: deregister the MS in block 518; black list the IP address associated with the MS for a period of time in block 520; notify a system operator of the dropped message and deregistration of the mobile station in block 522; or log information about the dropped message and deregistration of the mobile station in block 524.

Figure 6:
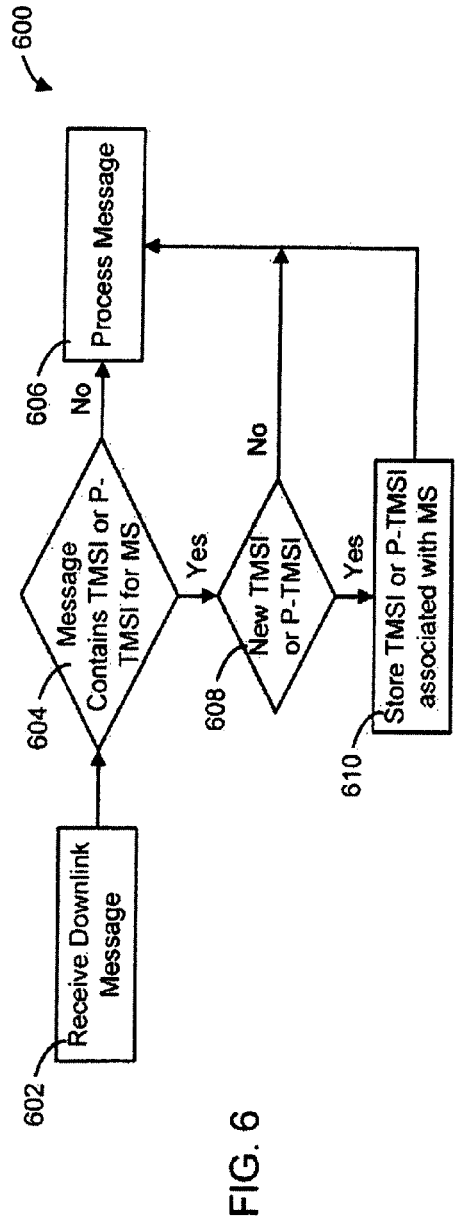
FIG. 6 is a flow chart depicting a method in accordance with one embodiment of the present invention with respect to downlink messages.

Referring now to FIG. 6, a flow chart depicting a method 600 in accordance with one embodiment of the present invention with respect to downlink messages is shown. A downlink message is received in block 602. If the downlink message does not contain a TMSI or P-TMSI for the MS (or is undetectable), as determined in decision block 604, the downlink message is processed in block 606 (e.g., forwarded, executed, etc.). If, however, the downlink message contains a TMSI or P-TMSI for the MS, as determined in decision block 604, and the TMSI or P-TMSI is not new (i.e., the UNC or GANC 116 has already stored and associated it with the MS), as determined in decision block 608, the downlink message is processed normally in block 606. If, however, the TMSI or P-TMSI is new, as determined in decision block 608, the TMSI or P-TMSI is stored and associated with the MS in block 610 and the message is processed normally in block 606.

Figure 7:
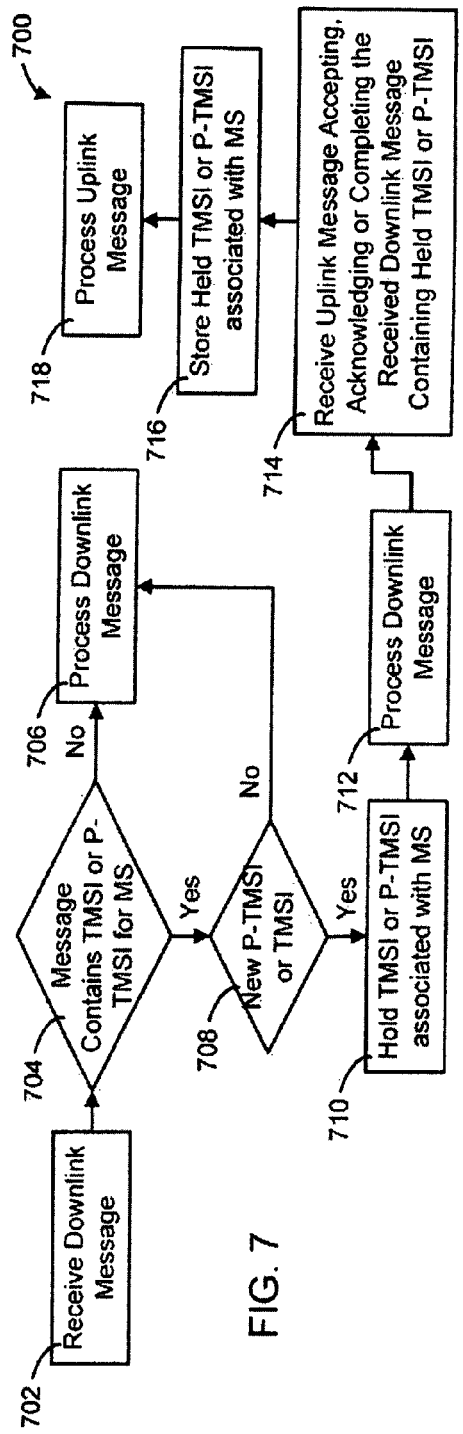
FIG. 7 is a flow chart depicting a method in accordance with another embodiment of the present invention with respect to downlink messages.

Now referring to FIG. 7, a flow chart depicting a method 700 in accordance with another embodiment of the present invention with respect to downlink messages is shown. A downlink message is received in block 702. If the downlink message does not contain a TMSI or P-TMSI for the MS (or is undetectable), as determined in decision block 704, the downlink message is processed in block 706 (e.g., forwarded, executed, etc.). If, however, the downlink message contains a TMSI or P-TMSI for the MS, as determined in decision block 704, and the TMSI or P-TMSI is not new (i.e., the UNC or GANC has already stored and associated it with the MS), as determined in decision block 708, the downlink message is processed normally in block 706. If, however, the TMSI or P-TMSI is new, as determined in decision block 708, the TMSI or P-TMSI is held in block 710 and the message is processed normally in block 712. The TMSI or P-TMSI is held until an uplink message is received that accepts, acknowledges or completes the received downlink message containing the held TMSI or P-TMSI in block 714. Thereafter, the held TMSI or P-TMSI is stored and associated with the MS in block 716 and the uplink message is processed normally in block 718.

Note that any of the above-described methods can be implemented as a computer program embodied on a computer readable medium wherein the various method steps are implemented by one or more code segments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

The invention claimed is:

1. A method for protecting a core network the method comprising the steps of:
receiving a message from a mobile station in an uplink direction, wherein
the message contains a mobile identity of the mobile station, and
the message is received at a network controller within an unlicensed mobile access network or a generic access network;
determining at the network controller whether the received mobile identity matches a stored mobile identity associated with the mobile station, wherein
the determining further comprises performing a layer violation by sneaking into upper layer messages sent by the mobile station towards the core network; and
dropping the message at the network controller whenever the received mobile identity does not match the stored mobile identity.

2. The method as claimed in claim 1, further comprising the step of processing the message whenever the received mobile identity matches the stored mobile identity associated with the mobile station.

3. The method as claimed in claim 1, wherein the mobile identity is an International Mobile Subscriber Identity, a Temporary Mobile Subscriber Identity or a Packet Temporary Mobile Subscriber Identity.

4. The method as claimed in claim 1, wherein the message is an uplink message or a downlink message.

5. The method as claimed in claim 4, wherein the uplink message is received from a mobile switching center or a General Packet Radio Service support node.

6. The method as claimed in claim 1, further comprising the step of storing the received mobile identity at the network controller and processing the received message whenever the received message is a registration request.

7. The method as claimed in claim 1, further comprising the step of storing the received mobile identity at the network controller and processing the received message whenever the received message is a downlink message and the received mobile identity is a new mobile identity for the mobile station.

8. The method as claimed in claim 7, wherein the received mobile identity is not stored at the network controller until an uplink message is received that accepts, acknowledges or completes the downlink message.

9. The method as claimed in claim 1, wherein the step of dropping the received message further comprises the steps of:

deregistering the mobile station;
black listing an Internet Protocol address associated with the mobile station for a period of time;
notifying a system operator of the dropped message and deregistration of the mobile station; or
logging information about the dropped message and deregistration of the mobile station.

10. The method as claimed in claim 1, wherein the received message is Mobility Management message, a General Packet Radio Service Mobility Management message, or a Unlicensed Mobile Access message or Unlicensed Radio Resources message.

11. The method as claimed in claim 1, wherein the network controller is an unlicensed network controller within an unlicensed mobile access network or a generic access network controller within a generic access network in communication with the core network.

12. A non-transitory computer-readable storage medium comprising computer-readable instructions, when executed by at least one processor, are configured for:
receiving a message from a mobile station in an uplink direction, wherein
the message contains a mobile identity of a mobile station, and
the message is received at a network controller within an unlicensed mobile access network or a generic access network;
determining at the network controller whether the received mobile identity matches a stored mobile identity associated with the mobile station, wherein the computer-readable instructions, when executed by the at least one processor are further configured for
performing a layer violation by sneaking into upper layer messages sent by the mobile station towards the core network; and
dropping the message at the network controller whenever the received mobile identity does not match the stored mobile identity.

13. The non-transitory computer-readable storage medium as claimed in claim 12, wherein the computer-readable instructions, when executed by the at least one processor is further configured for processing the message whenever the received mobile identity matches the stored mobile identity associated with the mobile station.

14. The non-transitory computer-readable storage medium as claimed in claim 12, wherein the computer-readable instructions, when executed by the at least one processor is further configured for storing the received mobile identity at the network controller and processing the received message whenever the received message is a registration request.

15. The non-transitory computer-readable storage medium as claimed in claim 12, wherein the computer-readable instructions, when executed by the at least one processor is further configured for storing the received mobile identity at the network controller and processing the received message whenever the received message is a downlink message and the received mobile identity is a new mobile identity for the mobile station.

16. The non-transitory computer-readable storage medium as claimed in claim 15, wherein the received mobile identity is not stored at the network controller until an uplink message is received that accepts, acknowledges or completes the downlink message.

17. A network controller within an unlicensed mobile access network or a generic access network, to protect the core network comprising:

a data storage device and a processor communicably coupled to the data storage device that receives a message from a mobile station in an uplink direction, wherein the message contains a mobile identity of the mobile station, and wherein the data storage device stores associations of mobile identities to mobile stations; and the processor determines whether the received mobile identity matches a stored mobile identity associated with the mobile station by performing a layer violation by sneaking into upper layer messages sent by the mobile station towards the core network and drops the message whenever the received mobile identity does not match the stored mobile identity.

18. The network controller as claimed in claim 17, wherein the network controller is an unlicensed network controller or a generic access network controller.

19. The network controller as claimed in claim 17, wherein the processor processes the message whenever the received mobile identity matches the stored mobile identity associated with the mobile station.

20. The network controller as claimed in claim 17, wherein the processor stores the received mobile identity to the data storage and processes the received message whenever the received message is a registration request.

21. The network controller as claimed in claim 17, wherein the processor stores the received mobile identity to the data storage and processes the received message whenever the received message is a downlink message and the received mobile identity is a new mobile identity for the mobile station.

22. The network controller as claimed in claim 21, wherein the received mobile identity is not stored until an uplink message is received that accepts, acknowledges or completes the downlink message.

* * * * *

UNITED STATES PATENT AND TRADEMARK OFFICE
CERTIFICATE OF CORRECTION

PATENT NO. : 8,428,553 B2  
APPLICATION NO. : 11/814522  
DATED : April 23, 2013  
INVENTOR(S) : Vikberg et al.

Page 1 of 1

It is certified that error appears in the above-identified patent and that said Letters Patent is hereby corrected as shown below:

In the Specifications

In Column 4, Line 27, delete "MSCNLR" and insert -- MSC/VLR --, therefor.

Signed and Sealed this  
Thirteenth Day of August, 2013

Teresa Stanek Rea  
*Acting Director of the United States Patent and Trademark Office*